(12) United States Patent
Jang et al.

(10) Patent No.: US 10,029,630 B2
(45) Date of Patent: Jul. 24, 2018

(54) FUEL ECONOMY DISPLAY DEVICE

(71) Applicant: DOOSAN INFRACORE CO., LTD., Incheon (KR)

(72) Inventors: Jeong Kwon Jang, Cheongju-si (KR); Hong Cheol Yun, Guri-si (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 174 days.

(21) Appl. No.: 14/762,752

(22) PCT Filed: Jan. 22, 2014

(86) PCT No.: PCT/KR2014/000622
§ 371 (c)(1),
(2) Date: Jul. 22, 2015

(87) PCT Pub. No.: WO2014/116024
PCT Pub. Date: Jul. 31, 2014

(65) Prior Publication Data
US 2015/0353034 A1    Dec. 10, 2015

(30) Foreign Application Priority Data
Jan. 23, 2013    (KR) .................. 10-2013-0007576

(51) Int. Cl.
*B60R 16/023*    (2006.01)
*G07C 5/00*    (2006.01)
*E02F 9/26*    (2006.01)

(52) U.S. Cl.
CPC .......... *B60R 16/0236* (2013.01); *E02F 9/267* (2013.01); *G07C 5/004* (2013.01)

(58) Field of Classification Search
CPC ...... B60R 16/0236; G07C 5/004; E02F 9/267
See application file for complete search history.

(56) References Cited

U.S. PATENT DOCUMENTS

| | | | |
|---|---|---|---|
| 5,027,609 A | 7/1991 | Yashiki et al. | |
| 2008/0042489 A1* | 2/2008 | Lewis | B60K 6/48 303/152 |

(Continued)

FOREIGN PATENT DOCUMENTS

| | | |
|---|---|---|
| CN | 101310081 A | 11/2008 |
| EP | 2477012 A2 | 7/2012 |

(Continued)

OTHER PUBLICATIONS

European Search Report dated Sep. 1, 2016 for European Application No. 14743713.1.

(Continued)

*Primary Examiner* — Hung Q Nguyen
*Assistant Examiner* — Xiao Mo
(74) *Attorney, Agent, or Firm* — Hauptman Ham, LLP (57) ABSTRACT

A device for displaying fuel efficiency including: a plurality of sensors; an alternator; an engine control unit; a display unit configured to include at least one of an eco symbol displaying an instant amount of operation load, an eco gauge displaying average fuel efficiency, and a fuel efficiency system displaying instant fuel efficiency or average fuel efficiency; an equipment control unit configured to determine a current state of equipment, change and display the eco symbol of the display unit according to the current state of the equipment, calculate average fuel efficiency by using instant fuel efficiency and torque data calculated by the engine control unit, and display the calculated average fuel efficiency or instant fuel efficiency through the eco gauge and the fuel efficiency system of the display unit; and a memory unit configured to store the instant fuel efficiency and the average fuel efficiency.

7 Claims, 5 Drawing Sheets

(56) References Cited

U.S. PATENT DOCUMENTS

| | | | | |
|---|---|---|---|---|
| 2010/0082190 A1* | 4/2010 | Jinno | .................... | B60K 6/365 |
| | | | | 701/22 |
| 2010/0102945 A1* | 4/2010 | Watson | ................. | B60K 35/00 |
| | | | | 340/462 |
| 2010/0207755 A1* | 8/2010 | Watson | ................. | B60K 35/00 |
| | | | | 340/450.2 |
| 2010/0207757 A1* | 8/2010 | Hernandez | ............ | B60K 6/445 |
| | | | | 340/461 |
| 2011/0095878 A1* | 4/2011 | Skaff | ...................... | B60K 6/445 |
| | | | | 340/441 |
| 2011/0153175 A1* | 6/2011 | Zhang | ................. | B60W 40/09 |
| | | | | 701/70 |
| 2014/0189585 A1* | 7/2014 | Brush | ................... | B60R 16/023 |
| | | | | 715/808 |

FOREIGN PATENT DOCUMENTS

| | | | |
|---|---|---|---|
| JP | 2005098988 A | 4/2005 | |
| JP | 2008062791 A | 3/2008 | |
| JP | 2010203148 A | 9/2010 | |
| JP | 2011157751 A | 8/2011 | |
| JP | 2011-190680 A | 9/2011 | |
| KR | 1020110073705 A | 6/2011 | |

OTHER PUBLICATIONS

International Search Report for PCT/KR2014/000622 dated May 12, 2014.

* cited by examiner

FUEL ECONOMY DISPLAY DEVICE

TECHNICAL FIELD

The present disclosure relates to a fuel efficiency display device of construction machinery.

BACKGROUND ART

In general, in construction machinery, such as an excavator, fuel efficiency is considerably different according to an operation pattern, such as a manipulation habit, of an operator. Especially, the construction machinery performs an operation over a long time, and the amount of fuel consumed of an engine is large, so that even though the same operation is performed by using the construction machinery, the amount of fuel consumed is considerably different for each operator.

In general, when construction equipment starts and begins to operate, an engine is driven at working revolutions per minute (RPM) (about 2,000 to 2,500 RPM), and when the operation is completed, that is, the operation is not continuously performed after a predetermined time from the completion time of the operation, the engine is driven at auto idle RPM (about 1,200 RPM).

When there is no separate operation for a front operation, a steering operation, and travelling for a predetermined time after the engine is driven at the auto idle RPM, it is determined that the engine is an idle state, and the auto idle RPM is decreased to an idle RPM (about 800 RPM), and as a result, the engine is minimally driven.

As described above, the construction machinery has a large difference in the amount of fuel consumed depending on the manipulation habit or an operation of equipment, so that it is necessary to induce an operator to operate the construction machinery with an efficient operation pattern. Accordingly, there is a device displaying a current operation load and operation fuel efficiency to an operator for promoting optimum fuel use and changing an operation pattern of an operator in an operation state.

However, there is no particular method of confirming, by an operator, fuel efficiency of an operation of the user currently performed with the construction machinery in comparison with fuel efficiency of a previous operation or an usual operation.

DISCLOSURE

Technical Problem

The present disclosure is conceived so as to solve the problems in the related art, and an object of the present disclosure is to provide a fuel efficiency display device capable of intuitively confirming fuel efficiency of construction machinery and comparing fuel efficiency of a current operation with fuel efficiency of an usual operation.

Technical Solution

In order to achieve the aforementioned object, an exemplary embodiment presented in the present specification suggests a device for displaying fuel efficiency. The device includes: a plurality of sensors configured to sense at least one of a displacement of a joystick, a hydraulic pressure, and a pressure of a pump, and transmit sensed information; an alternator configured to output a voltage representing rotary force of an engine; an engine control unit configured to calculate engine revolutions per minute (RPM), instant fuel efficiency, and torque data; a display unit configured to include at least one of an eco symbol displaying an instant amount of operation load, an eco gauge displaying average fuel efficiency, and a fuel efficiency system displaying instant fuel efficiency or average fuel efficiency; an equipment control unit configured to determine a current state of equipment based on the sensed information received from the plurality of sensors and the engine RPM received from the engine control unit, change and display the eco symbol of the display unit according to the current state of the equipment, calculate average fuel efficiency by using instant fuel efficiency and torque data calculated by the engine control unit, and display the calculated average fuel efficiency or instant fuel efficiency through the eco gauge and the fuel efficiency system of the display unit; and a memory unit configured to store the instant fuel efficiency and the average fuel efficiency.

Effects

As described above, the present disclosure provides the fuel efficiency display device, which displays average fuel efficiency and instant fuel efficiency of construction machinery, thereby enabling a user to intuitively confirm fuel efficiency according to an operation state of the user and improving operation efficiency.

DESCRIPTION OF DRAWINGS

FIG. 1 is a diagram illustrating an eco symbol according to an exemplary embodiment of the present disclosure.

DETAILED DESCRIPTION OF CERTAIN INVENTIVE EMBODIMENTS

Technical terms used in the present specification are used only to describe specific exemplary embodiments, and are not intended to limit the present disclosure. Further, technical terms used in the present specification shall be construed as a meaning generally understood by those skilled in the art unless they are specially defined in the present specification, and shall not be construed in excessively general or narrow meanings. Further, when technical terms used in the present specification are improper technical terms, which fail to correctly express the spirit of the present disclosure, the technical terms shall be substituted with technical terms, which those skilled in the art may properly understand, to be understood. Further, a general term used in the present disclosure shall be construed according to a meaning defined in a dictionary or the context of a related description, and shall not be construed to have an excessively narrow meaning.

Further, singular expressions used in the present specification include plural expressions unless they have definitely opposite meanings. In the present application, it shall not be construed that terms, such as "including" or "comprising", various constituent elements or steps described in the specification need to be all essentially included, and it shall be construed that some constituent elements or steps among the various constituent elements or steps may be omitted, or additional constituent elements or steps may be further included.

Further, "module" and "unit" suffixes for components used in the present specification are given or mixed and used by considering only easiness in preparing a specification and do not have a meaning or role distinguished from each other in themselves.

Terms, such as "first" and "second", including an ordinal number used in the present specification may be used for describing various constituent elements, but the constituent elements should not be limited by the terms. The terms are used only to discriminate one constituent element from another constituent element. For example, without departing a scope of the present disclosure, the first component may be referred to as the second component and similarly, the second component is also referred to as the first component.

Hereinafter, an exemplary embodiment of the present disclosure will be described in detail with reference to the accompanying drawings, in which like reference numerals refer to like or similar constituent elements regardless of the reference numerals and a duplicated description thereof will be omitted.

In describing the present disclosure, when it is determined that the detailed description of the known art related to the present disclosure may obscure the gist of the present disclosure, the detailed description thereof will be omitted. Further, it is noted that the accompanying drawings are used just for easily appreciating the spirit of the present disclosure and it should not be analyzed that the spirit of the present disclosure is limited by the accompanying drawings.

A method and a device for displaying fuel efficiency according to the present disclosure display an eco symbol, an eco gauge, and an instant/average fuel efficiency system.

The eco symbol displays the instant amount of operation load, the eco gauge displays the average amount of fuel consumed (hereinafter, "average fuel efficiency"), and the instant/average fuel efficiency system displays the instant amount of fuel consumed (hereinafter, "instant fuel efficiency") or average fuel efficiency. Hereinafter, the eco symbol, the eco gauge, and the instant/average fuel efficiency system according to the exemplary embodiment of the present disclosure will be described in detail.

FIG. 1 is a diagram illustrating the eco symbol according to the exemplary embodiment of the present disclosure. As described above, the eco symbol displays the instant amount of operation load. The eco symbol may be formed, for example, in a specific shape (for example, a leaf shape) as illustrated in FIG. 1, and a character "ECO" may be written over an inner side and an external side of a specific shape. Further, a color of the eco symbol may be changed to green, yellow, red, gray, and the like according to an operation state of construction machinery. For example, when the instant amount of operation load of the construction machinery is in a normal state, the eco symbol is displayed with green, and when the instant amount of operation load of the construction machinery is in an overload state, the eco symbol is displayed with red. Further, when the construction machinery is in an operation state, the eco symbol is displayed with yellow, and in conditions other than the aforementioned conditions, the eco symbol is displayed with gray. A particular condition for changing a color of the eco symbol according to an operation state of the construction machinery will be described below.

Figure 2:
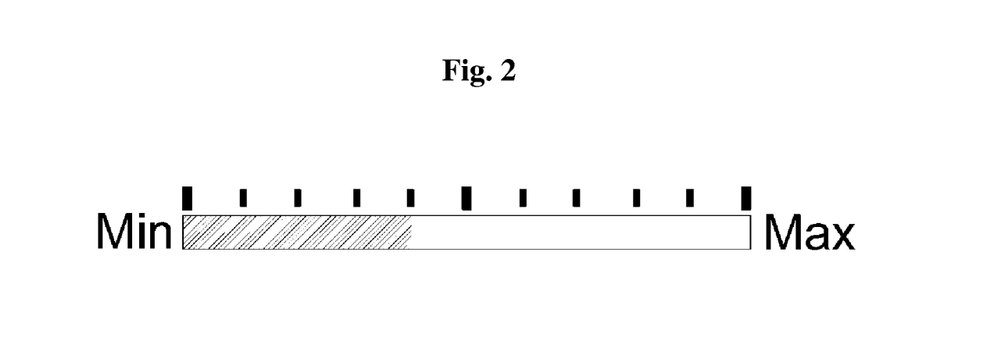
FIG. 2 is a diagram illustrating an eco gauge according to the exemplary embodiment of the present disclosure.

FIG. 2 is a diagram illustrating the eco gauge according to the exemplary embodiment of the present disclosure. As described above, the eco gauge indicates average fuel efficiency. The eco gauge is formed in a bar shape, and a color of the eco gauge is changed according to the average fuel efficiency of the construction machinery. That is, a left side of the eco gauge shaped like a bar is displayed with green, a right side thereof is displayed with red, and a center thereof is displayed with yellow, and the eco gauge displays a corresponding color according to current average fuel efficiency. When average fuel efficiency of the construction machinery is good, the eco gauge is displayed with green, and when average fuel efficiency of the construction machinery is poor, the eco gauge is displayed with red. Further, when average fuel efficiency of the construction machinery is normal, the eco gauge is displayed with yellow.

Figure 3:
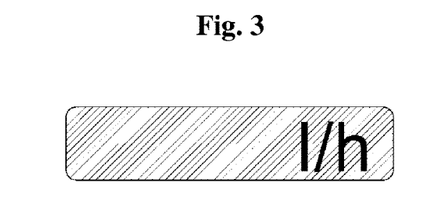
FIG. 3 is a diagram illustrating an instant/average fuel efficiency system according to the exemplary embodiment of the present disclosure.

FIG. 3 is a diagram illustrating the instant/average fuel efficiency system according to the exemplary embodiment of the present disclosure. As described above, the instant/average fuel efficiency system displays instant fuel efficiency or average fuel efficiency in a form of a number. The instant/average fuel efficiency system sequentially changes and displays average fuel efficiency incurred at the time of a previous operation, maximum instant fuel efficiency, and minimum instant fuel efficiency when a key is initially turned on, and alternately displays current maximum instant fuel efficiency and minimum instant fuel efficiency after the equipment starts. Accordingly, a user may confirm a fuel efficiency state of currently used equipment.

Figure 4:
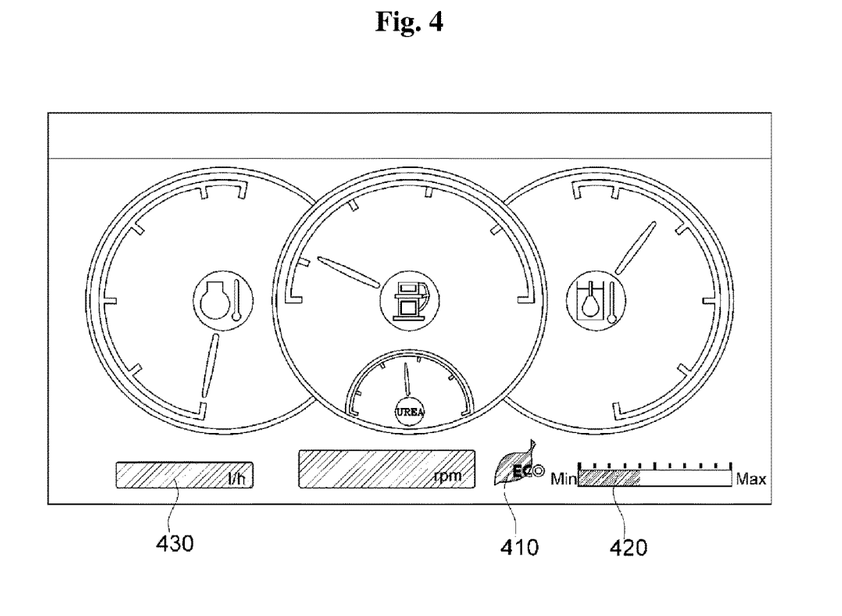
FIG. 4 is a diagram illustrating a screen of a gauge of construction machinery according to the exemplary embodiment of the present disclosure.

FIG. 4 is a diagram illustrating a screen of a gauge of construction machinery according to the exemplary embodiment of the present disclosure. As illustrated in FIG. 4, a screen of a gauge of construction machinery according to the exemplary embodiment of the present disclosure may include an eco symbol 410, an eco gauge 420, and an instant/average fuel efficiency system 430.

Figure 5:
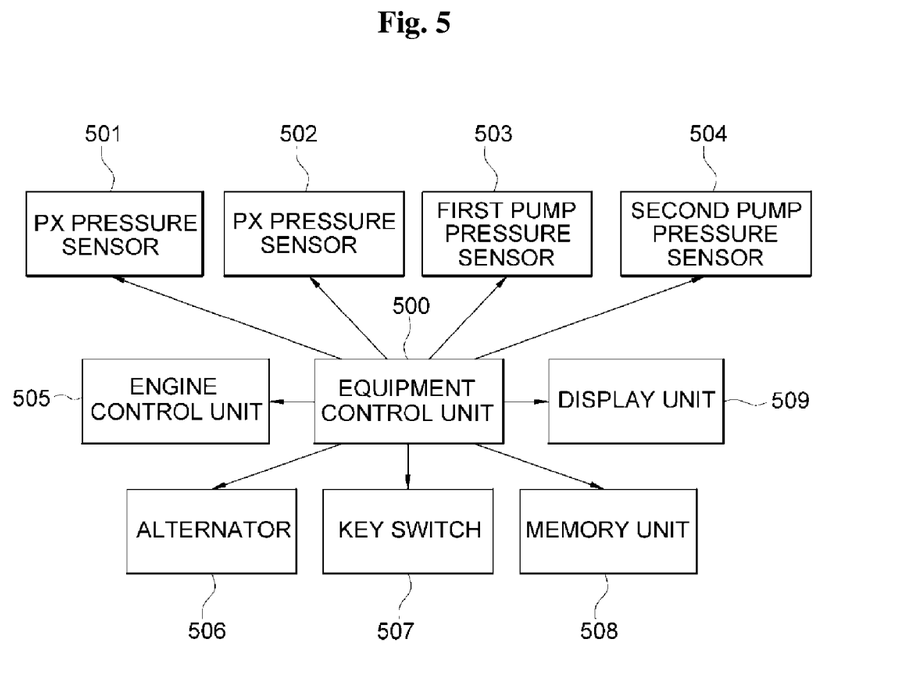
FIG. 5 is a diagram illustrating a configuration of a fuel efficiency display device according to the exemplary embodiment of the present disclosure.

FIG. 5 is a diagram illustrating a configuration of a fuel efficiency display device according to the exemplary embodiment of the present disclosure.

Referring to FIG. 5, the fuel efficiency display device according to the exemplary embodiment of the present disclosure includes an equipment control unit 500, a plurality of sensors 501 to 504, an engine control unit 505, an alternator 506, a key switch 507, a memory unit 508, and a display unit 509. Here, the plurality of sensors 501 to 504 includes a Px pressure sensor 501, a Py pressure sensor 502, a first pump pressure sensor 503, and a second pump pressure sensor 504.

The engine control unit 505 calculates information about a current engine state (hereinafter, "engine state information"), and transmits the calculated engine state information to the equipment control unit 500. That is, the engine control unit 505 transmits engine driving information indicating whether the engine is currently driven, engine RPM, the instant amount of fuel consumed, and torque data to the equipment control unit 500.

The Px pressure sensor 501 is a sensor sensing whether an operation is performed, for example, a sensor sensing a movement of a joystick. The Py pressure sensor 502 is a sensor sensing hydraulic pressure when equipment travels. The first pump pressure sensor 503 and the second pump pressure sensor 504 are sensors sensing pressure of a first pump and pressure of a second pump, respectively. Accordingly, the plurality of sensors 501 to 504 transmits the sensed information to the equipment control unit 500.

The alternator 506 outputs a voltage indicating rotary force of the engine to the equipment control unit 500.

The key switch 507 determines whether a key is inserted, and transmits information about the insertion of the key (hereinafter, "key insertion information") to the equipment control unit 500.

The equipment control unit 500 controls the eco symbol, the eco gauge, and the instant/average fuel efficiency system displayed on the display unit 509 based on the information received from the plurality of sensors 501 to 504, the engine control unit 505, the alternator 506, and the key switch 507.

Particularly, the equipment control unit 500 determines a current state of construction machinery based on engine RPM received from the engine control unit 505, the sensed information received from the plurality of sensors 501 to 504, and the key insertion information received from the key switch 507, and controls the display unit 509, so that a color of the eco symbol is changed according to the current state of the construction machinery.

Further, the equipment control unit 500 gathers the instant amounts of fuel consumed and the torque data received from the engine control unit 505, assigns predetermined weighted values to the gathered instant amounts of fuel consumed and the gathered torque data, respectively, and sums the instant amounts of fuel consumed and the torque data, calculates an average of the summed instant amounts of fuel consumed and the summed torque data, and calculates average fuel efficiency, and controls the display unit 509, so that the calculated average fuel efficiency is displayed on the eco gauge. In this case, the equipment control unit 500 stores the calculated average fuel efficiency in the memory unit 508.

Further, the equipment control unit 500 controls the display unit 509, so that the average fuel efficiency and the instant fuel efficiency stored in the memory unit 508 are alternately displayed on the instant/average fuel efficiency system. To this end, the equipment control unit 500 may store the instant amount of fuel consumed received from the engine control unit 505, that is, the instant fuel efficiency, in the memory unit 508.

The memory unit 508 stores the aforementioned average fuel efficiency and instant fuel efficiency.

The display unit 509 includes the eco symbol displaying the instant amount of operation load, the ego gauge displaying average fuel efficiency, and the instant/average fuel efficiency system displaying average fuel efficiency or instant fuel efficiency.

Hereinafter, the eco symbol will be described in detail.

When the key is inserted (key-on) and the engine is not operated, the eco symbol is displayed with gray.

When the construction machinery is in a no-load state, that is, the engine moves and is normally operated, the eco symbol is displayed with green.

When the construction machinery is in a middle-load state, that is, the engine moves and is normally operated (a middle-load of the construction machinery), the eco symbol is displayed with yellow.

When the engine of the construction machinery is in an urgent-load state, that is, when a current engine RPM of the engine is equal to or smaller than an engine RPM at the time of a pump control, a color of the eco symbol is changed from green to red. In general, when the engine RPM is equal to or smaller than a minimum RPM for controlling the pump, an urgent load is generated in the engine, and in this case, a color of the eco symbol is changed to red.

When the construction machinery is in a load operation state, that is, when an average pressure of the pump exceeds 90% of a relief pressure, a color of the eco symbol is changed from green to red.

The method of changing a color of the eco symbol by the equipment control unit 500 will be described below in detail.

When there is no sensed information received from the Px pressure sensor 501 and the Py pressure sensor 502, the equipment control unit 500 controls the display unit 509, so that the eco symbol is displayed with green.

When the engine RPM received from the engine control unit 505 is equal to or smaller than a pump control RPM, the equipment control unit 500 controls the display unit 509, so that the eco symbol is displayed with red.

When the sensed information, that is, the average pressure of the pump, received from the pump pressure sensors 503 and 504 exceeds 90% of the relief pressure, the equipment control unit 500 controls the display unit 509, so that the eco symbol is displayed with red.

Hereinafter, the eco gauge will be described in detail.

Figure 6:
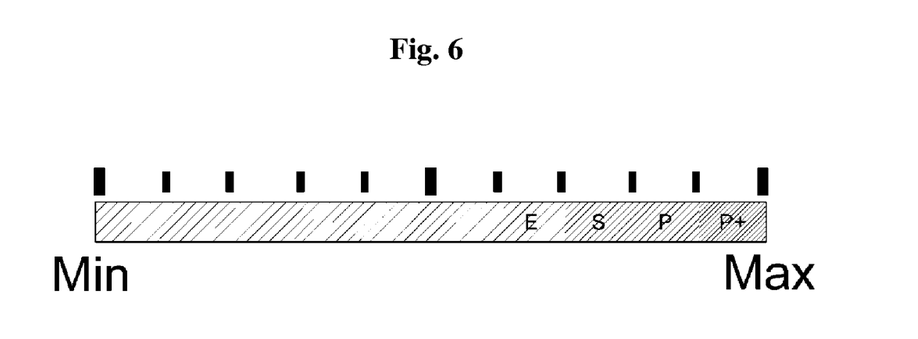
FIG. 6 is a diagram illustrating a detailed configuration of the eco gauge according to the exemplary embodiment of the present disclosure.

The eco gauge displays average fuel efficiency while matching the average fuel efficiency for each operation mode. FIG. 6 is a diagram illustrating a detailed configuration of the eco gauge according to the exemplary embodiment of the present disclosure. Referring to FIG. 6, the eco gauge is formed of first to tenth levels. Here, the first to seventh levels are displayed with green, and the eighth and ninth levels are displayed with yellow, and the tenth level is displayed with red. As a matter of course, the number of levels and the number of colors for each level of the eco gauge may be varied.

Figure 7:
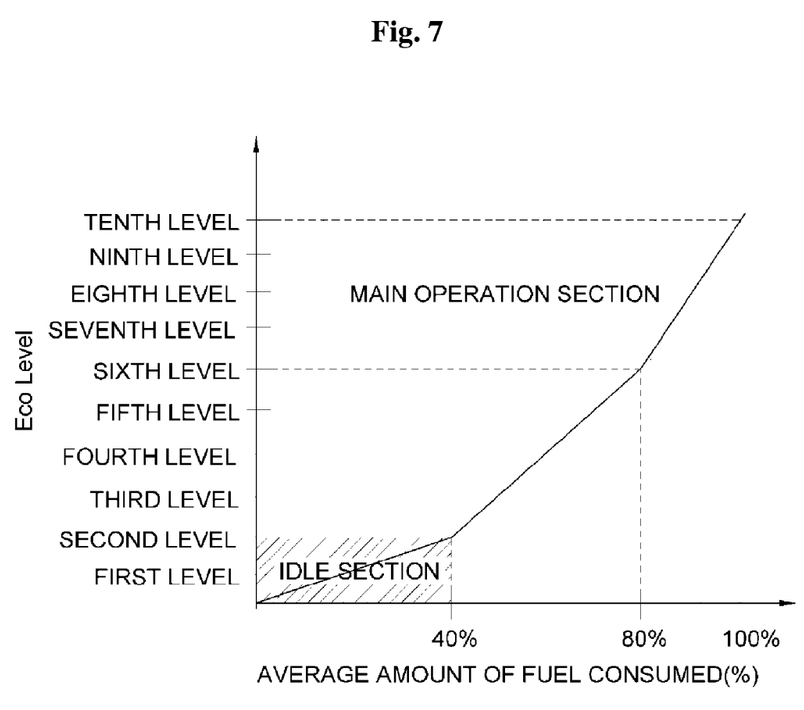
FIG. 7 is a graph illustrating a level of the eco gauge according to the average amount of fuel consumed.

FIG. 7 is a graph illustrating a level of the eco gauge according to the average amount of fuel consumed. Referring to FIG. 7, the level of the eco gauge is formed of first to tenth levels as illustrated in FIG. 6.

The eco gauge is displayed with green in an idle section, that is, sections at the first and second levels, in which the average amount of fuel consumed is smaller than 40%.

The eco gauge is displayed with green in a section, that is, sections at the third to sixth levels, in which the average amount of fuel consumed is equal to or larger than 40% and smaller than 80%.

However, in a main operation section, that is, a section in which the average amount of fuel consumed is equal to or larger than 80% and smaller than 100%, in which fuel consumption is relatively large, the eco gauge is not displayed with one color, but is displayed with green, yellow, and red according to the average amount of fuel consumed. That is, according to FIGS. 6 and 7, when the average amount of fuel consumed belongs to the section at the seventh level in the section, in which the average amount of fuel consumed is equal to or larger than 80% and equal to or smaller than 100%, the eco gauge is displayed with green, when the average amount of fuel consumed is at the eighth and ninth levels, the eco gauge is displayed with yellow, and when the average amount of fuel consumed is at the tenth level, the eco gauge is displayed with red. As described above, in the present disclosure, in the main operation section, the eco gauge is not displayed with one color, but is displayed with green, yellow, and red according to the average amount of fuel consumed.

As described above, the eco gauge may more effectively notify an operator of a fuel efficiency status through a differential display of the level. That is, in the idle section, in which the average amount of fuel consumed is 40%, an inclination is small, in which two levels are changed, but in the section, in which the average amount of fuel consumed is 40% to 80%, the inclination is large, in which four levels changed while the average amount of fuel consumed is changed by 40%, and in the main operation section, in which the average amount of fuel consumed is 80% to 100%, the inclination is large in which four levels are changed while the average amount of fuel consumed is changed by 20%. Further, a color of the eco gauge may be changed in a region, in which the average amount of fuel consumed is larger than 80%. For example, this means that when the average amount of fuel consumed is 80% to 85%, a color of the eco gauge may be green, when the average amount of fuel consumed is 88% to 95%, a color of the eco gauge may be yellow, and when the average amount of fuel consumed exceeds 95%, a color of the eco gauge may be red. The average amount of fuel consumed in the main operation section is 80% to 100%, which is narrow, but a color of the eco gauge in the corresponding section is displayed with green, yellow, and red, thereby more effectively transferring fuel efficiency to the operator.

A change in a level of the eco gauge may be larger according to the change in the average amount of fuel consumed in the main operation section, in which the average amount of fuel consumed is large, than the idle section, in which the average amount of fuel consumed is small. Accordingly, the eco gauge may more sensitively respond to fuel consumption in a state where equipment is mainly operated, and notify the operator of a current eco state. The aforementioned configuration is different from that of eco equipment for a vehicle collectively displaying fuel consumption according to a travelling distance, and may be a configuration optimized for construction equipment driving the equipment at a specific load and/or RPM.

Hereinafter, the instant/average fuel efficiency system will be described in detail.

Figure 8:
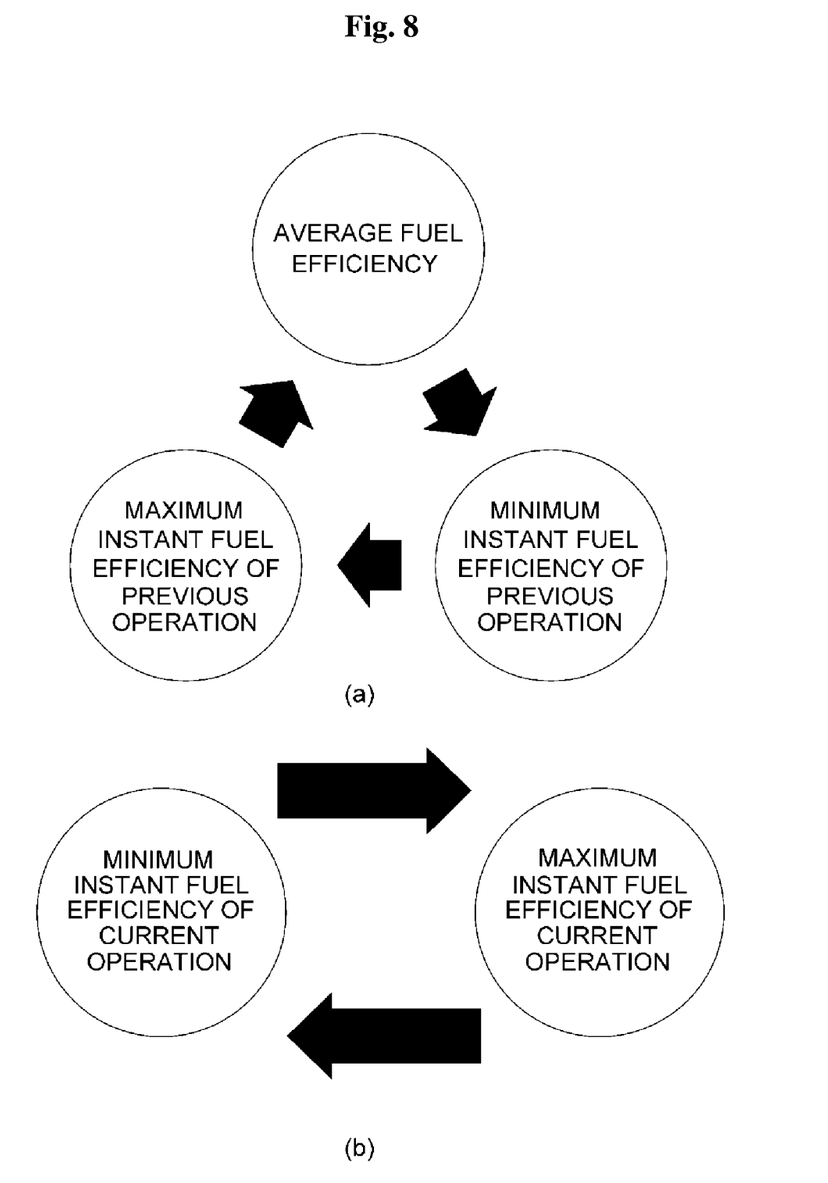
FIG. 8 is a diagram for describing a method of displaying average fuel efficiency and instant fuel efficiency in the instant/average fuel efficiency system according to the exemplary embodiment of the present disclosure.

The instant/average fuel efficiency system alternately displays average fuel efficiency and instant fuel efficiency. FIG. 8 is a diagram for describing a method of displaying average fuel efficiency and instant fuel efficiency in the instant/average fuel efficiency system according to the exemplary embodiment of the present disclosure. When the key is initially turned on, the instant/average fuel efficiency system sequentially changes and displays average fuel efficiency at the time of a previous operation, and maximum instant fuel efficiency and minimum instant fuel efficiency of the previous operation as illustrated in FIG. 8A. After equipment starts, the instant/average fuel efficiency system alternately displays maximum instant fuel efficiency and minimum instant fuel efficiency of a current operation as illustrated in FIG. 8B.

A method of displaying, by the equipment control unit 500, average fuel efficiency and instant fuel efficiency on the instant/average fuel efficiency system will be described below in detail.

The equipment control unit 500 controls the display unit 509, so that the average fuel efficiency, maximum instant fuel efficiency, and minimum instant fuel efficiency of a previous state, which are stored in the memory unit 508, are sequentially changed and displayed on the instant/average fuel efficiency system when the key is initially turned on. In this case, the average fuel efficiency may be average fuel efficiency of the total operation period of equipment for a long period, and average fuel efficiency of the previous operation for a short period. Further, the equipment control unit 500 controls the display unit 509, so that maximum instant fuel efficiency and minimum instant fuel efficiency of a current operation after the start of the equipment (that is, when a voltage output by the alternator 506 is 12 V or more) are alternately displayed on the instant/average fuel efficiency system. Here, the equipment control unit 500 stores maximum instant fuel efficiency and minimum instant fuel efficiency of the current operation when the key is turned off in the memory unit 508.

Further, the eco gauge and the eco symbol are changed according to an operation load, average fuel efficiency, and the like in real time, so that the equipment control unit 500 controls the display unit 509, so that maximum instant fuel efficiency and minimum instant fuel efficiency at an operation after the eco gauge and the eco symbol are changed are alternately displayed on the instant/average fuel efficiency system.

The exemplary embodiments disclosed in the present specification have been described with reference to the accompanying drawings. As described above, the exemplary embodiments illustrated in the respective drawings shall not be limitedly construed, and it may be construed that the exemplary embodiments may be combined by those fully understanding the contents of the present specification, and when the exemplary embodiments are combined, some constituent elements may be omitted.

Here, the terms or words used in the present specification and the claims should not be construed as being limited as a commonly used or lexical meaning, and should be construed as a meaning and a concept to conform with the technical spirit disclosed in the present specification.

Therefore, the exemplary embodiments described in the present specification and the configurations illustrated in the drawings are only an exemplary embodiment disclosed in the present specification and do not represent all of the technical spirit disclosed in the present specification, and thus it is to be understood that various equivalent matters and modified examples, which may replace the exemplary embodiments and the configurations, are possible at the time of filing the present application.

INDUSTRIAL APPLICABILITY

According to the fuel efficiency display device for construction equipment according to the present disclosure, the fuel efficiency display device displaying average fuel efficiency and instant fuel efficiency of construction machinery may enable a user to intuitively confirm fuel efficiency according to an operation state of the user and improve operation efficiency, which exceeds a limit of the related art, so that a device, to which the present disclosure is applied, may sufficiently be marketed or available to sell, as well as the relevant technology is used, and the fuel efficiency display device according to the present disclosure may be realistically and clearly carried out, thereby being an industrially applicable present disclosure.

The invention claimed is:

1. A device for displaying fuel efficiency of construction equipment, comprising:
   a plurality of sensors configured to sense at least one of a displacement of a joystick, a hydraulic pressure, and a pressure of a pump, and transmit sensed information;
   an engine control unit configured to calculate current engine revolutions per minute (RPM), instant fuel efficiency, and torque data;

a display unit configured to include an eco symbol displaying an instant amount of operation load;

an equipment control unit configured to
determine a current state of equipment based on the sensed information received from the plurality of sensors and the current engine RPM received from the engine control unit,
change and display a color of the eco symbol of the display unit according to the current state of the equipment, and
calculate the average fuel efficiency by using the instant fuel efficiency and the torque data calculated by the engine control unit; and a memory unit configured to store the instant fuel efficiency and the average fuel efficiency, wherein the equipment control unit changes the color of the eco symbol
when construction machinery is in a key-on state and the engine is not operated,
when the construction machinery is in a no-load state and the engine is operated,
when the construction machinery is in a middle-load state and the engine is operated,
when a pressure of the pump is equal to or larger than a predetermined pressure of a relief pressure, or
when the current engine RPM is equal to or smaller than minimum RPM for controlling the pump, that the minimum RPM is smaller than an engine RPM at the time of a pump control.

2. The device of claim 1, wherein the equipment control unit is configured to
gather the instant fuel efficiency and the torque data,
assign a weighted value to each of the gathered instant fuel efficiency and the gathered torque data and sums the instant fuel efficiency and the torque data, and
calculate average fuel efficiency by calculating an average of the summed instant fuel efficiency and the summed torque data.

3. The device of claim 1, further comprising:
a key switch configured to transmit key insertion information when a key is inserted, and
the display unit further comprises a fuel efficiency system displaying instant fuel efficiency or average fuel efficiency,
wherein when the equipment control unit receives the key insertion information from the key switch, the equipment control unit controls the display unit so that average fuel efficiency, maximum instant fuel efficiency and minimum instant fuel efficiency before a key insertion state, which are stored in the memory unit, are sequentially changed and displayed on the fuel efficiency system.

4. The device of claim 1, further comprising:
an alternator configured to output a voltage representing rotary force of an engine,
the display unit further comprises a fuel efficiency system displaying instant fuel efficiency or average fuel efficiency,
wherein when the voltage output by the alternator is equal to or larger than a predetermined voltage, the equipment control unit controls the display unit so that current maximum instant fuel efficiency and minimum instant fuel efficiency are alternately displayed on the fuel efficiency system.

5. The device of claim 1,
the display unit further comprises a fuel efficiency system displaying instant fuel efficiency or average fuel efficiency,
wherein the equipment control unit controls the display unit so that a color of the eco symbol of the display unit is changed into any one of gray, green, yellow, and red according to a current state of equipment and displayed, and current instant fuel efficiency and minimum instant fuel efficiency are alternately displayed on the fuel efficiency system according to the change of the color of the eco symbol.

6. The device of claim 1,
the display unit further comprises a eco gauge displaying average fuel efficiency,
wherein the eco gauge is divided into a plurality of levels, and the plurality of levels is divided into a plurality of color regions for each operation mode, and
the equipment control unit controls the display unit so that current maximum instant fuel efficiency and minimum instant fuel efficiency are alternately displayed on the fuel efficiency system according to a change of the plurality of color regions.

7. The device of claim 6, wherein the engine control unit makes the level of the eco gauge have a larger change according to the change of the average fuel efficiency in a region, in which average fuel efficiency is large, than a region, in which average fuel efficiency is small.

* * * * *